United States Patent
Abogabir

(10) Patent No.: US 7,543,976 B2
(45) Date of Patent: Jun. 9, 2009

(54) LIGHTING SYSTEM FOR GENERATING LIGHT AND AN IMAGE

(75) Inventor: Ximena Munoz Abogabir, Santiago (CL)

(73) Assignee: Comercial Luxia Limitada, Santiago (CL)

( * ) Notice: Subject to any disclaimer, the term of this patent is extended or adjusted under 35 U.S.C. 154(b) by 0 days.

(21) Appl. No.: 11/811,628

(22) Filed: Jun. 11, 2007

(65) Prior Publication Data

US 2007/0285914 A1 Dec. 13, 2007

(30) Foreign Application Priority Data

Jun. 9, 2006 (CL) .................................. 1422-2006

(51) Int. Cl.
*F21V 7/09* (2006.01)

(52) U.S. Cl. ...................... 362/633; 362/601; 362/609; 362/812

(58) Field of Classification Search ......... 362/602–605, 362/609, 633, 812
See application file for complete search history.

(56) References Cited

U.S. PATENT DOCUMENTS

| | | | | | |
|---|---|---|---|---|---|
| 4,519,017 | A | * | 5/1985 | Daniel | 362/565 |
| 4,842,378 | A | * | 6/1989 | Flasck et al. | 349/70 |
| 4,918,578 | A | * | 4/1990 | Thompson | 362/634 |
| 5,410,463 | A | | 4/1995 | Jean et al. | |
| 5,641,219 | A | * | 6/1997 | Mizobe | 362/623 |
| 5,743,616 | A | * | 4/1998 | Giuliano et al. | 362/612 |
| 5,810,465 | A | | 9/1998 | Hargabus | |
| 5,918,396 | A | | 7/1999 | Jung | |
| 6,530,164 | B2 | * | 3/2003 | Gai | 40/546 |
| 6,796,700 | B2 | * | 9/2004 | Kraft | 362/560 |
| 6,971,758 | B2 | * | 12/2005 | Inui et al. | 362/602 |
| 7,147,903 | B2 | * | 12/2006 | Ouderkirk et al. | 428/35.7 |
| 7,357,551 | B2 | * | 4/2008 | Yang et al. | 362/606 |
| 2004/0125588 | A1 | * | 7/2004 | Ho | 362/31 |
| 2004/0130885 | A1 | * | 7/2004 | Nakano | 362/31 |
| 2005/0281055 | A1 | * | 12/2005 | Chang | 362/633 |
| 2007/0159850 | A1 | * | 7/2007 | Yang et al. | 362/613 |
| 2007/0199218 | A1 | * | 8/2007 | Jiang et al. | 40/546 |
| 2008/0062116 | A1 | * | 3/2008 | Morbieu et al. | 345/102 |

FOREIGN PATENT DOCUMENTS

| | | | |
|---|---|---|---|
| EP | 41390 | A1 * | 12/1981 |
| EP | 0221018 | | 5/1987 |
| FR | 2731500 | | 9/1996 |
| GB | 2256960 | | 12/1992 |

* cited by examiner

*Primary Examiner*—Jong-Suk (James) Lee
*Assistant Examiner*—Leah S Lovell
(74) *Attorney, Agent, or Firm*—D. Peter Hochberg; Sean F. Mellino; Daniel J. Smola

(57) ABSTRACT

A lighting system to be used as an architectural panel or wall or communication device. The system works as a decorative or marketing element comprising a structural framework. The framework comprises an apparatus to affix in the frontal and back sides, an apparatus for the generation of light and images, and a reflective element located in the back side of the framework. The apparatus for generation of light is a source of light located around the internal edge of the framework. The image display is a luminescent layer comprising an external surface and an internal surface. The internal surface is intervened to allow the passage of the light produced by the source of light, and the light exits and is reflected on the reflective element to in turn be reflected on the internal surface of the luminescent layer.

7 Claims, 6 Drawing Sheets

LIGHTING SYSTEM FOR GENERATING LIGHT AND AN IMAGE

CROSS-REFERENCE TO RELATED APPLICATION

This application claims foreign priority based on Chile Patent Application No. 1422-2006, filed on Jun. 9, 2006, the content of which is incorporated herein by reference in its entirety.

BACKGROUND OF THE INVENTION

1. Field of the Invention

The present disclosure relates to a two-dimension lighting system which produces a three dimension effect. It is based on two concepts: fluorescence and reflection to create a three-dimensional visual effect in relation to space and light.

This system can have multiple applications, from artistic applications to architectural applications. It can be used as a decorative object such as a lamp, a panel, a wall, a dividing wall in an hall, entry point for a building or a complete facade.

It comprises two planes made of different materials: one of such materials is fluorescent luminescent, while the other is a reflecting material which is placed in the back side of the fluorescent material.

A source for lighting purposes is placed in one or more edges of the fluorescent material. The fluorescent material has a number of superficial cuts (either lines or points of light) which, when receiving the stimulation from the light render a one plane luminescence comprising these lines or points of light.

A highly reflective material, thermoformed or with certain type of relief or segmentations, is placed in the backside of the fluorescent material. The material receives the lines or shapes of light from the fluorescent material, then disassemble the lines thus creating a unique three-dimensional effect. The separation distance between both materials (fluorescent and reflector) is variable based on the type of application. Colour of said fluorescent material, colour of said source of light, the manner in which both fluorescent material and reflector material are manipulated may vary as to create a different range of visual effects and colours.

2. Background of the Prior Art

Systems comprising both fluorescent or phosphorescence and reflection lighting simultaneously have been present in previous art. Most of these systems relate to lighting devices using reflection to spread light in an even manner or to, increase the efficiency of light produced. Most of these inventions use prismatic mirrors which, while comprising a specific geometric design, tend to augment, direct or correct a source of light rather than create a three-dimensional effect.

U.S. Pat. No. 5,410,463 (Jean et al.) issued on Apr. 25, 1995 discloses a decorative source of light which is covered by a magnetic substance comprising the light rendered by a device thereof attached within an electric plug, and further comprising a shallow case peripherally coated with an inner layer of a magnetic substance which has the same magnetic polarity of the magnetic substance present in the electric plug and further coated with a fluorescent layer to make the shallow cap float within the electric plug by the effect of the magnetic force (repulsion). The light issued by the device irradiates in all directions.

The document EP 0 221 018 (Held Reto) published on May 6, 1987 discloses a billboard or sign lighted wherein at least in one frontal wall the device comprises a box comprising two crystal plates or dishes and wherein a display media to show the information is located in the middle of the plates or dishes. The inner side of the crystal plate comprises a layer that partially reflects the light. The source of light is placed outside the visible part of the crystal plate around the area of the framework. The back wall of the device also comprises a light reflector which covers the inner side. Luminous rays rendered by the source of light, at least in part, are reflected by the layers, wherein the part of light penetrating the crystal plates and the media carrying the information emerge from the device in the manner of luminous rays.

Another existing field of application is decorative systems with a 3D effect. In this field the inventions are closer in their approach to the system proposed. Among these cases, U.S. Pat. No. 5,810,465 (Hargabus) issued on Sep. 22, 1998 discloses a luminous device wherein black energy or glowing UV or "black" light or blue-black light is introduced between a totally reflective mirror and a partial reflection or one sided mirror. UV light hits an object located between the two mirrors, wherein the object is made of or formed at least in part with fluorescent plastic or coated or impregnated with fluorescent dye paint. The object then renders a visible light which is the event on the reflecting mirror to reflect in the back part of the object, thus creating on the reflective mirror the effect of an infinity of fluorescent objects.

GB Patent No. 2,256,960 (Ball Keith) published on Dec. 23, 1992 discloses a lighted mirror unit to create the perception of an extended space over a one dimension or included unit. The unit comprises two or more mirror surface panels wherein they are at least double-sided, and further comprising a source of light. The unit includes at least two inner coatings comprising reflective panels of any given size or shape, and there is at least one double-sided mirror surface, and a source of light, and also translucent walls. The source of light may be within the unit. The source of light allows the inner part of the unit to be seen from one or several sides based on the number of double-sided mirror surfaces employed. Any given object placed within the unit and/or inner surfaces of the unit is reflected to infinity.

FR Patent No. 2,731,500 (Wagner Gilles) published on Sep. 13, 1996 discloses an object comprising a luminous object placed between two parallel panels made of a light reflective material. At least one of the panels is partially transparent and comprises one fixed plate with at least one coating layer of semi-reflective and semi-transparent material which is made of aluminium-covered polyester. The fixed plate can either be made of acrylic crystal or plexiglass. The object can be made of a phosphorescent or fluorescent material and is lighted by a source of light placed on one of the sides.

The last existing field more recently dated uses the phenomena of fibre optics in axial lighting (by the sides) by using a fluorescent material. Examples found only use this method without including reflection thereof. For these cases, U.S. Pat. No. 5,918,396 (Jung) issued on Jul. 6, 1999 discloses an enhanced billboard comprising thermoformed plastic holding at least one semi-circular, linear inner surface covered with a highly reflective plastic film and a clear plastic film with dimensions slightly smaller than the opening cut area therefore. One side of the billboard or sign is covered to convey the luminous energy rendered by the source of light positioned around the plastic. The clear plastic film extends to create an irregular geometric line detached from the cutting edge of the bevelled face to create an irregular lighted line or geometry of the edge which is visible as a line surrounding the graphics of the billboard or sign to viewers from the opposite side of the billboard or sign. An extended length of the clear plastic film can be used as an erasable surface moistened for writing purposes by using liquid fluorescent markers, which is useful to show a strong sign along with written graphics or messages surrounded by the lighted line in a fixed display.

SUMMARY OF THE PRESENT INVENTION

The system of the present invention comprises two layers or planes of different materials: a luminescent layer, e.g., fluorescent acrylic or phosphorescent with different colours and widths. This acrylic has the same properties of fibre optics, i.e. receives the light rendered on its edges and conveys the light to the other end of the material. Similar to fibre optics, when interrupted in one of its points, the light exists through that imperfection. When scratching or cutting the fluorescent acrylic at surface level, the light running along the material exits through the points or areas, thus generating a "line or point of light."

Thus, a luminescent player or strata is created which is lighted by the side by a source of light and which is "scratched", "written" or intervened to make the light pass out through certain points, thus creating a 2D surface graphically lighted (with a certain graphics).

This acrylic may have different widths. For a width greater than 10 mm, "lines or points of light" can be done on both sides, hence doubling the amount of light rendered.

Reflector strata (reproducing the luminescent strata): high reflection material (mirror, chromed, stainless steel, mirrored film) with "relief" (thermoformed or with straight shapes) positioned in the back of the luminescent strata. The "lines or points of light" are received on a reflective material relief which then render them creating "relieved lines or points of light." This new expression, along with "lines or points of light," creates a unique 3D effect.

The effect is created through the joint seam of both layers. It is not possible to create the effect by having the components separated.

The source of light includes any given device rendering linear light such as LED or fluorescent. The source of light must be placed in a parallel position to the luminescent layer to make the light enter through the edges.

The joining seam of the layers can be carried out by different manners based on the application, such as by creating a 3D volume (lamp or object), as a panel, wall, hall or facade of a building.

The distance between the layers also varies based on the application.

The color of the fluorescent material, the color of the source of light, and the manner in which both fluorescent material and reflector material are manipulated may vary to create a different range of visual effects and colours.

The present invention relates to a two dimension lighting system which generates a three-dimensional effect. It is based on two concepts: fluorescence and reflection to create a three-dimensional visual effect of space and light. This system can have multiple applications, from artistic applications to architectural applications. It can be used as a decorative object such as a lamp, a panel, a wall, a dividing wall in a hall, an entry point for a building or a complete facade. The invention comprises two planes made of different materials: one of such materials is fluorescent luminescent while the other is a reflecting material placed in the back side of the fluorescent material.

A source for lighting purposes is placed in one or more edges of the fluorescent material. The fluorescent material has a number of superficial cuts (either lines or points of light) which, when receiving the stimulation from the light render a one plane luminescence comprising these lines or points of light.

A highly reflective material, thermoformed or with a certain type of relief or segmentations, is placed in the backside of the fluorescent material. The material receives the light lines or shapes from the fluorescent material, and then disassembles the lines to create a unique three-dimensional effect. The separation distance between both materials (fluorescent and reflector) is variable based on the type of application. The color of the fluorescent material, the color of the source of light, and the manner in which both fluorescent material and reflector material are manipulated may vary to create a different range of visual effects and colours.

BRIEF DESCRIPTION OF THE DRAWINGS

The drawings herein which are included to provide a greater understanding of the invention, are herein incorporated and are integral part of the description and illustrate the previous art and one embodiment of the invention, and along with the description, facilitate the explanation of the principles of the invention.

DETAILED DESCRIPTION OF THE INVENTION

Figure 1:
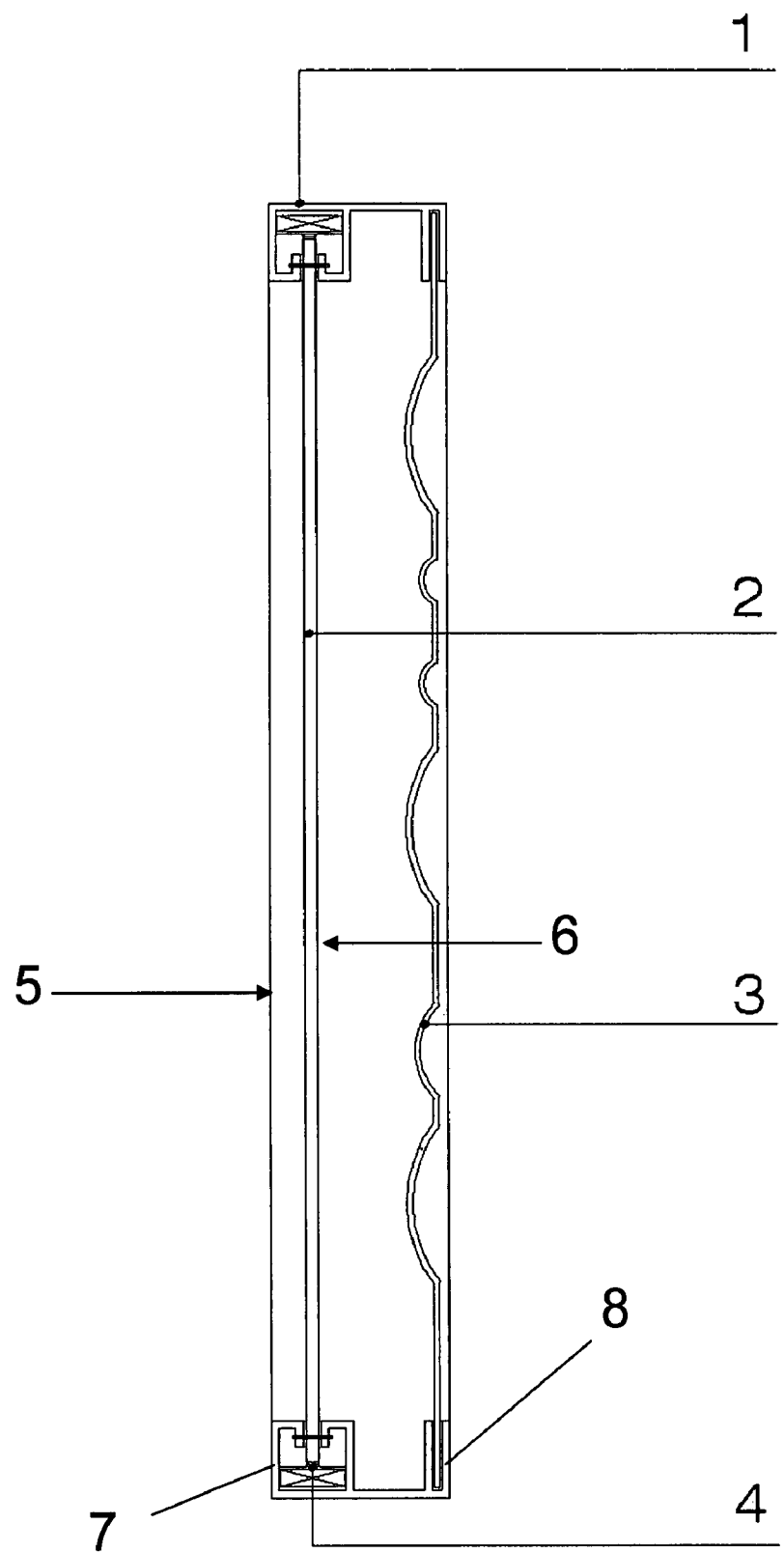
FIG. 1 illustrates a lateral cross-section of the system of the present invention.

The present disclosure relates to the invention of the present patent application which refers to a two-dimension lighting system which produces a three dimension effect. It is based on two concepts: fluorescence and reflection to create a three-dimensional visual effect relative to space and light.

This system can have multiple applications, from artistic applications to architectural applications. It can be used as a decorative object such as a lamp, a panel, a wall, a dividing wall in a hall, an entry point for a building or a complete facade.

The present invention comprises two planes made of different materials: one of such materials is fluorescent luminescent while the other is a reflecting material placed in the back side of the fluorescent material.

A source for lighting purposes is placed in one or more edges of the fluorescent material. The fluorescent material has a number of superficial cuts (either lines or points of light) which, when receiving the stimulation from the light, render a one plane luminescence comprising these lines or points of light.

A highly reflective material, thermoformed or with a certain type of relief or segmentations, is placed in the backside of the fluorescent material. The material receives the light lines or shapes from the fluorescent material and then disassembles the lines to create a unique three-dimensional effect. The separation distance between both materials (fluorescent and reflector) is variable based on the type of application. The color of the fluorescent material, the color of the source of light, and the manner in which both fluorescent material and reflector material are manipulated may vary to create a different range of visual effects and colours.

In reference to the figures, the present invention relates to a lighting system to be used as an architectural panel or wall or billboard operating as a decorative element or element for marketing purposes. The system comprises a structural framework (1), wherein the framework comprises an apparatus to fix the framework in the front (7) and in the back (8) sides, and comprising an apparatus for generation of light and images (2, 4), and a reflector element (3) which is located in the back part of the framework.

The apparatus for generation of light is a source of light (4) which is located outside the inner edge of the framework (1), and below the apparatus to secure the framework. The image media (2) is a luminescent layer (2) comprising an external surface (5) and an internal surface (6), wherein inner surface (6) is intervened to allow the passage of the light generated by source of light (4), where the light passes within the luminescent layer (2) towards the inner surface (6) that has been intervened wherein the light exits and is reflected on a reflector element (3), to be further reflected and refracted on the inner surface (6) of the luminescent layer (2).

Note from FIG. 1 that there is an existing interaction between the different elements of the invention to suggest that there is an existing synergic interaction or, a surprising result. In this case both layers reside within a simple framework (1). The luminescent layer (2), which is lighted by a source of light (4), is secured to the framework (1) on its external side by fixture apparatus (7). The inner face of the framework holds the reflective layer (3) which is affixed to the framework (1) by the means of fixture (8). In terms of the assembly, the means for fixture (7) and (8) may be troughs or rails located in the internal perimeter of the framework (1).

Figure 2:
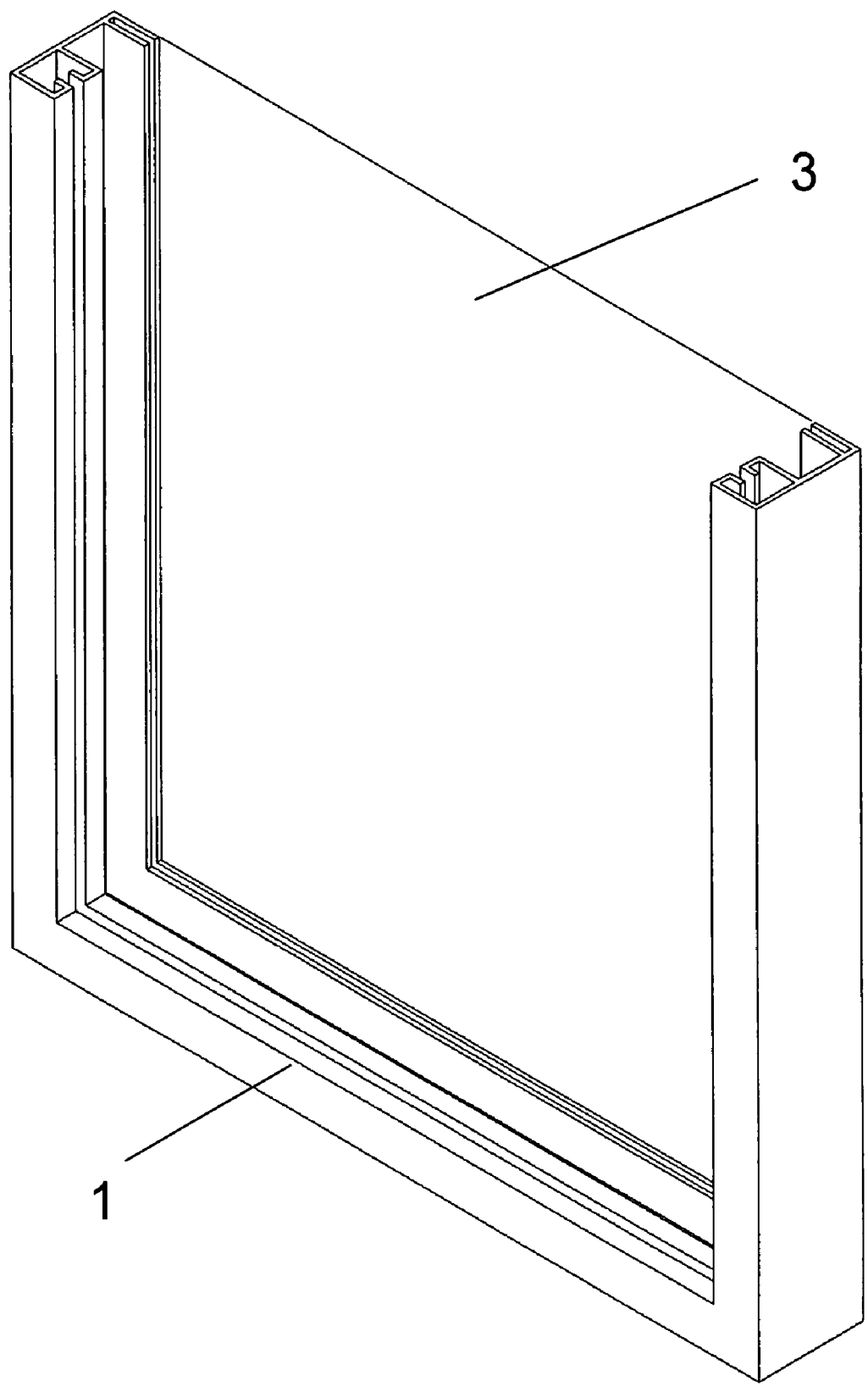
FIG. 2 illustrates a perspective view of the framework holding the system of the present invention.

FIG. 2 illustrates the framework in a simple form which can be made of any given material, plastic or metal, even wood, and which may hold in each face both layers 2, 3 and source of light 4 in two ends.

Figure 3:
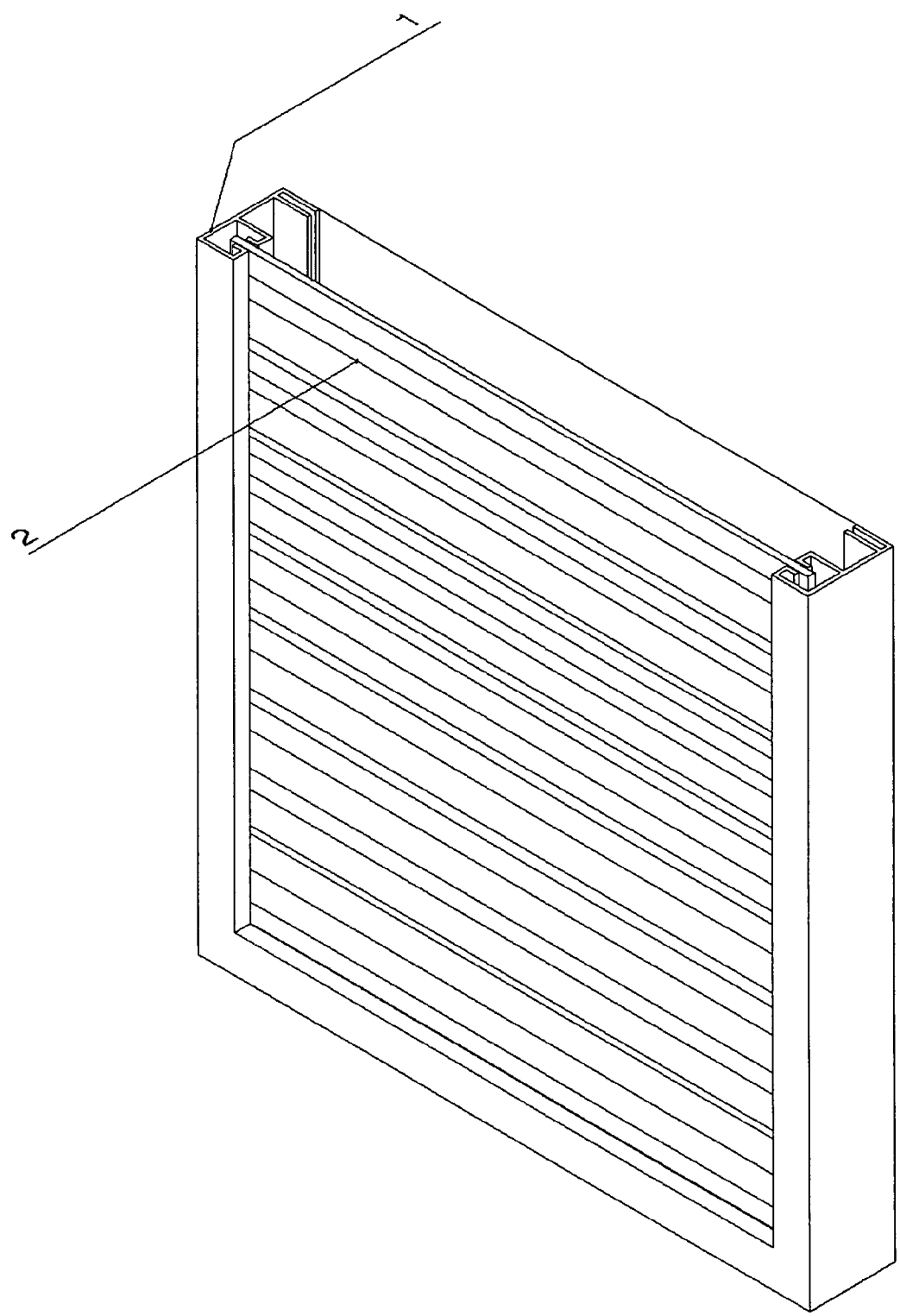
FIG. 3 illustrates a perspective view of the framework with the first luminescent layer of the present invention.

FIG. 3 illustrates the luminescent layer (2) comprising a freely scratched (written) phosphorescent or fluorescent acrylic. This acrylic may have different widths and colours and scratches or messages can also be free: lines, shapes, etc. This layer is positioned in the frontal part of the framework (1).

Figure 4:
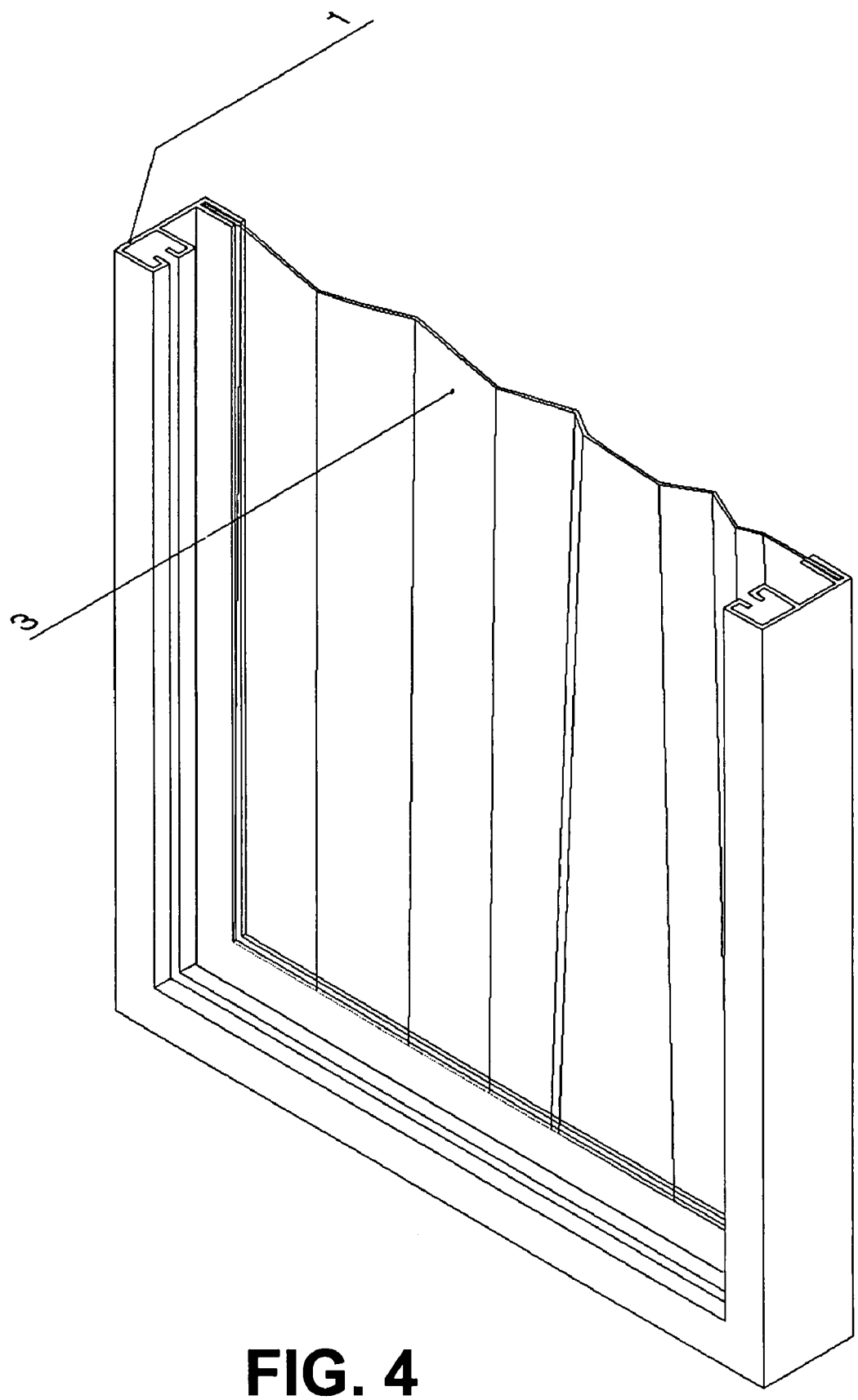
FIG. 4 illustrates a perspective view of the framework with the reflective layer of the present invention.

FIG. 4 illustrates the reflective layer (3) which should be made of a highly reflective material, mirror chrome, stainless steel, etc. It is material that the reflective layer 3 comprises a certain kind of relief by using thermoforming, modules holding a given three-dimensional shapes or reflective figures. This layer is positioned in the back part of the framework (1).

Figure 5:
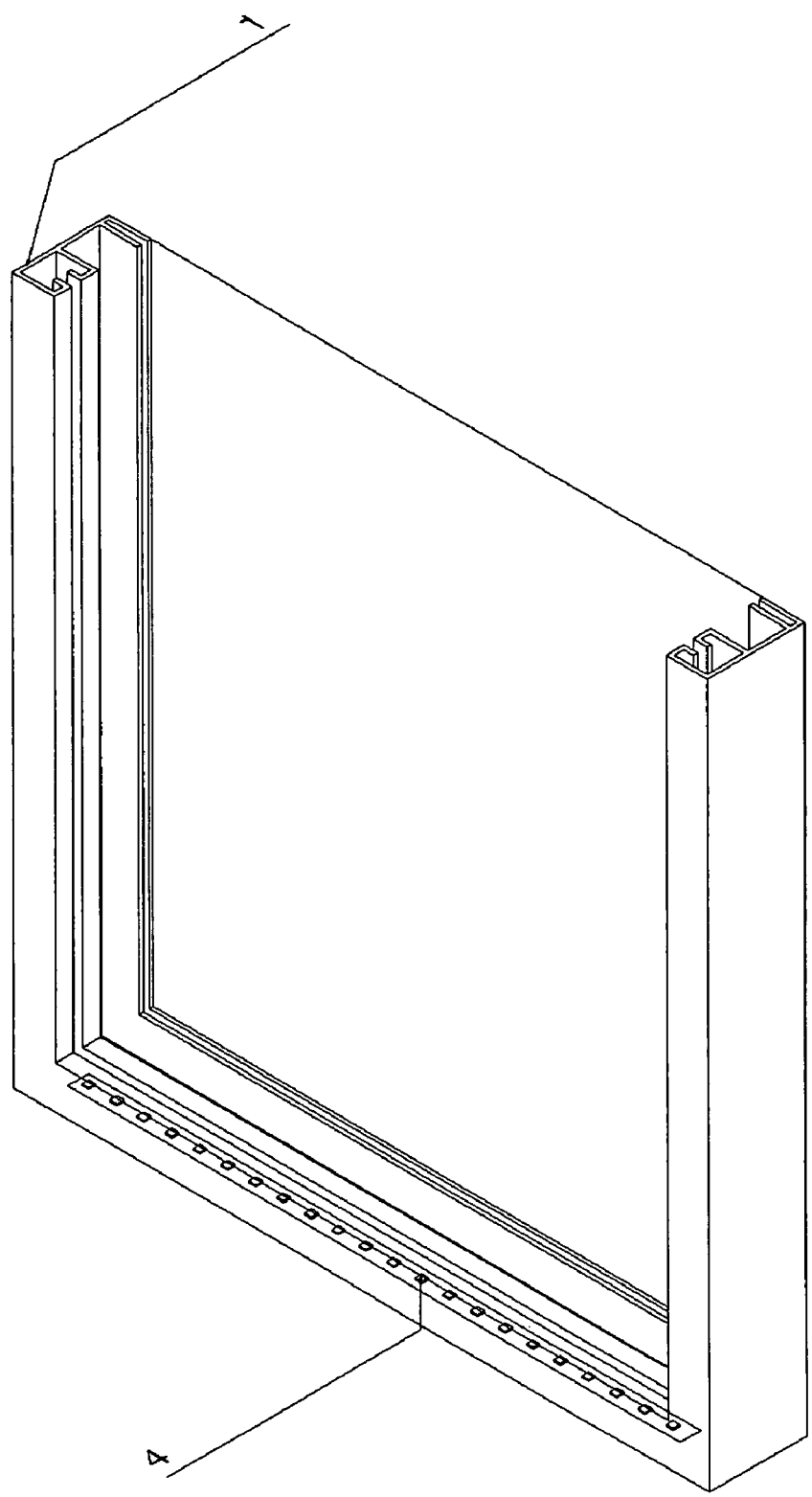
FIG. 5 illustrates a perspective view of the framework with the source of light of the present invention.

FIG. 5 illustrates the source of light (4). The source of light 4 should be placed in an axial position with respect to the luminescent layer 2 and is then placed within the framework (1).

Figure 6:
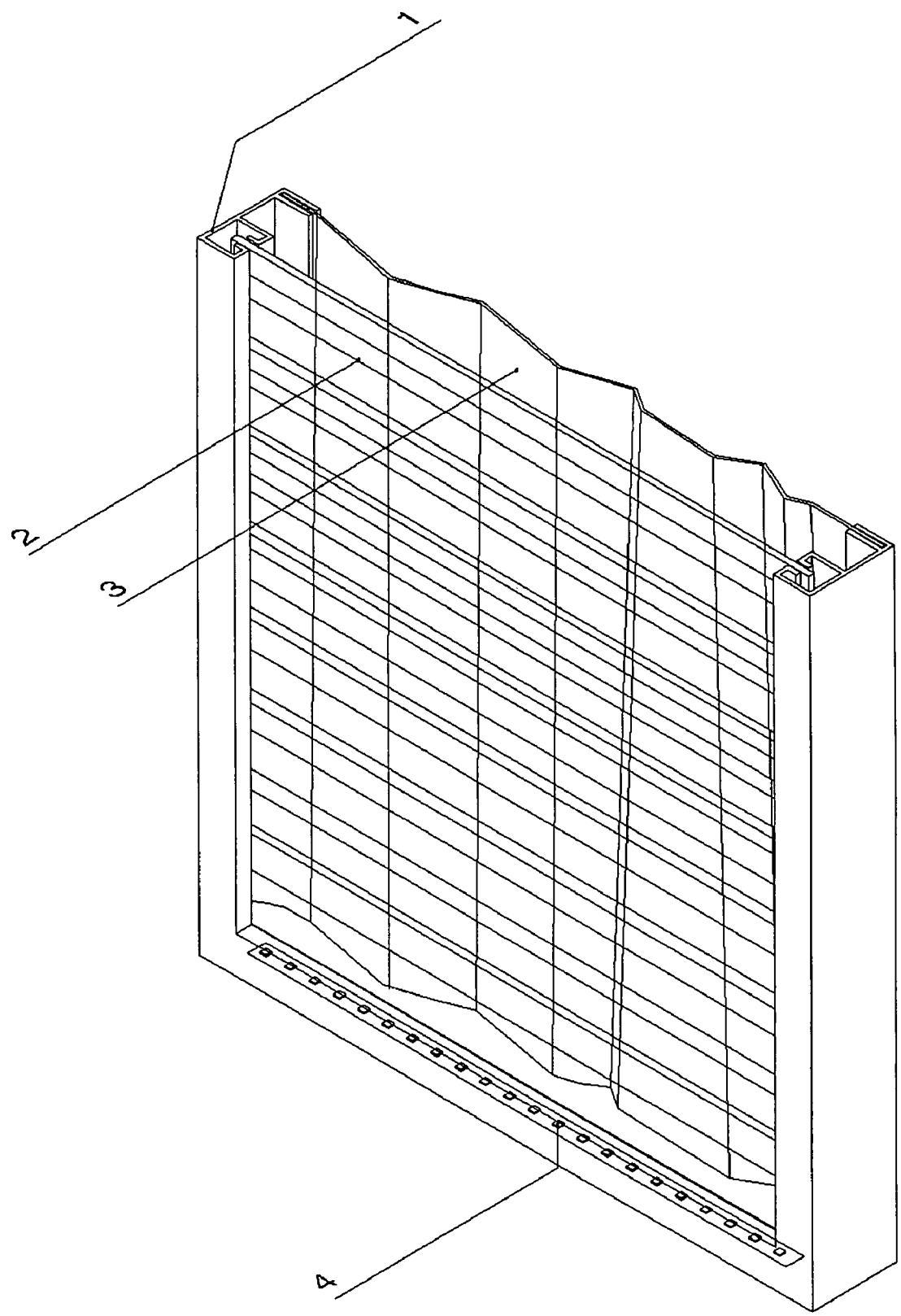
FIG. 6 illustrates a perspective view of the framework with the first luminescent layer, the reflective layer, and the source of light of the present invention.

FIG. 6 illustrates the framework holding the system (1), the luminescent layer (2), the reflective layer (3), and the source of light (4).

The luminescent layer (2) comprises an external surface (5) and an internal surface (6). The internal surface (6) should be intervened with scratches or semi-cuttings in free shape and format. The interventions force the light rendered by the source of light (4) to be conveyed and exit through the interventions.

The reflective layer (3), reflects the lines of light and reproduce them as per the shape thereof.

The invention can be applied as a lamp or board with reduced dimensions (length, width) and with a reduced distance between the layers 2, 3. As this is an object, it can be developed in a three-dimensional manner as a parallelepiped wherein the faces are the luminescent layer and the middle part is the reflective layer. In that latter case, an LED is used due to its reduced dimensions.

Accordingly, the invention may be applied as a wall or panel by increasing the dimension of the components for creating a division panel or wall supported by an existing wall. An LED or fluorescent can be used based on the dimensions.

Construction-wise, the invention can be used as an inner aisle or hall using the above dimensions provided that the clearance between the components is increased, which may be then used as entrance to the specific business or commercial venue (restaurant, bar, disco, hotel, etc.).

Communication-wise, the invention also has applications. The components are then intervened with known and recognizable elements as to create the three-dimension effect of a message, e.g., a public ad.

This invention also has applications in an architectural scenario. For that purpose, the luminescent layer is the outside of the building and the reflective layer is the internal part. Components can be used as modules. The luminescent layer can be replaced with fluorescent acrylic-injected glass or it is only necessary to cover both faces of the acrylic using glass.

What has been described above are preferred aspects of the present invention. It is of course not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, combinations, modifications, and variations that fall within the spirit and scope of the appended claims.

The invention claimed is:

1. A lighting system to be used as an architectural wall, panel or communicational apparatus, that works as a decorative or advertising apparatus, said system comprising:
   a structural frame having an inner and an outer perimeter, an inner perimeter front holding a front fixing apparatus, and an outer perimeter holding a back fixing apparatus, wherein the front fixing apparatus and the back fixing apparatus are spaced relative to each other leaving a variable gap;
   a luminescent layer or material with a high level of light transmission with an outer surface and an inner surface secured by the front fixing apparatus, said front fixing apparatus having a cavity for housing a linear LED light source, and a reflector element being secured by the back fixing apparatus, wherein the linear LED light source housed inside the front fixing apparatus cavity emits light towards the interior of the luminescent layer wherein the inner surface has been intervened by scratches or cuttings to allow for the light that goes through the interior of the luminescent layer to exit from said intervened inner surface towards the reflector element, the light then being reflected on said reflector element and to be refracted on the luminescent layer, wherein said reflector element is a deformed, non-straight sheet for obtaining a luminescent effect on the surface of the luminescent layer.

2. The lighting system according to claim 1, wherein the reflector element is a mirror.

3. The lighting system according to claim 1, wherein the luminescent layer is a sheet that comprises a material with a high level of light transmission.

4. The lighting system according to claim 3, wherein said sheet that comprises a material with a high level of light transmission selected from the group consisting of acrylic resin and glass.

5. The lighting system according to claim 1, wherein the luminescent layer is fiber optic.

6. The lighting system according to claim 1, wherein the luminous source is a plurality of bulbs.

7. The lighting system according to claim 1, wherein the luminous source is a plurality of linear LED's arranged in at least one edge of the luminescent material.

* * * * *